(12) United States Patent
Bishop et al.

(10) Patent No.: US 11,833,470 B2
(45) Date of Patent: Dec. 5, 2023

(54) CLOSED-LOOP BIOLOGICAL SYSTEMS AND METHODS UTILIZING AN ONSITE NON-POTABLE WATER TREATMENT FOR ODOR CONTROL IRRIGATION

(71) Applicant: Anua International LLC, Greensboro, NC (US)

(72) Inventors: Colin Bishop, Woodville, TX (US); Michael Busch, Greensboro, NC (US); M. Sean McGuigan, Hanover, VA (US)

(73) Assignee: Anua International LLC, Greensboro, NC (US)

( * ) Notice: Subject to any disclaimer, the term of this patent is extended or adjusted under 35 U.S.C. 154(b) by 0 days.

(21) Appl. No.: 17/376,555

(22) Filed: Jul. 15, 2021

(65) Prior Publication Data

US 2022/0016573 A1    Jan. 20, 2022

Related U.S. Application Data

(60) Provisional application No. 63/051,985, filed on Jul. 15, 2020.

(51) Int. Cl.
*B01D 53/85* (2006.01)
*C02F 3/04* (2023.01)
(Continued)

(52) U.S. Cl.
CPC .............. *B01D 53/85* (2013.01); *C02F 1/004* (2013.01); *C02F 3/04* (2013.01); *C02F 3/327* (2013.01);
(Continued)

(58) Field of Classification Search
CPC .. B01D 53/85; B01D 53/38; B01D 2252/103; B01D 2257/90; B01D 2258/06;
(Continued)

(56) References Cited

U.S. PATENT DOCUMENTS

| 4,251,359 A | * | 2/1981 | Colwell | .................... C02F 3/04 |
| | | | | 210/139 |
| 5,766,475 A | | 6/1998 | Mayer et al. | |

(Continued)

FOREIGN PATENT DOCUMENTS

| CN | 102499023 A | * | 6/2012 | ............. A01C 23/00 |
| DE | 4407734 C1 | * | 4/1995 | ................ C02F 3/00 |
| WO | WO-2019195543 A1 | * | 4/2019 | ................ C02F 1/28 |

OTHER PUBLICATIONS

What_is_sewage_sludge_and_what_can_be_done_with_it_.pdf(Year: 2010).*

(Continued)

*Primary Examiner* — Ekandra S. Miller-Cruz
(74) *Attorney, Agent, or Firm* — Downs Rachlin Martin PLLC

(57) ABSTRACT

A single-stage or multi-stage biological odor control treatment system for the removal of target vapor compounds from a contaminated air stream consisting of a first stage (onsite non-potable water treatment) where raw collection system non-potable water is extracted from the sewer collection system, screened and sprayed over a media bed where it is treated to secondary effluent water quality and is collected in a tank. The onsite non-potable water treatment system effluent is then pumped to the biological odor control system. This onsite non-potable water treatment system effluent is used for irrigating either a single media bed, or multiple media beds, which require continuous moisture and a source of nutrients. The microorganisms use the odorous compounds in the foul air stream as a food source. Treated air is then discharged to the atmosphere. The odor control treatment system drain water is then returned into the source containment collection point.

15 Claims, 1 Drawing Sheet

(51) Int. Cl.
 *C02F 1/00* (2023.01)
 *C02F 3/32* (2023.01)
(52) U.S. Cl.
 CPC .. *C02F 2201/005* (2013.01); *C02F 2301/046* (2013.01); *C02F 2303/02* (2013.01)
(58) Field of Classification Search
 CPC .. C02F 1/004; C02F 3/04; C02F 3/327; C02F 2201/005; C02F 2301/046; C02F 2303/02; C02F 3/302; Y02W 10/10; Y02W 10/37; Y02A 50/20
 USPC .......................................................... 210/617
 See application file for complete search history.

(56) References Cited

U.S. PATENT DOCUMENTS

| | | | |
|---|---|---|---|
| 6,019,810 A | 2/2000 | Phillips et al. | |
| 7,914,678 B2* | 3/2011 | Beggs | C02F 3/04 210/150 |
| 7,919,304 B2* | 4/2011 | Egan | B01D 53/84 607/94 |
| 11,338,244 B1* | 5/2022 | Davis | B01D 53/75 |
| 2008/0073270 A1* | 3/2008 | Smith | C02F 3/1226 210/150 |
| 2017/0217805 A1* | 8/2017 | Liu | C02F 3/109 |
| 2018/0021722 A1* | 1/2018 | Murphy | C02F 3/006 435/266 |
| 2020/0406189 A1 | 12/2020 | Davis et al. | |
| 2021/0179445 A1* | 6/2021 | Licht | C02F 1/283 |

OTHER PUBLICATIONS

Faq-pfas-factsheet-doh_1_. pdf (Year: 2019).*
Dunaev, Timur, The Biology of Biofiltration and Odor Control, Water Online, Guest Column, Nov. 28, 2017, pp. 1-2.

* cited by examiner

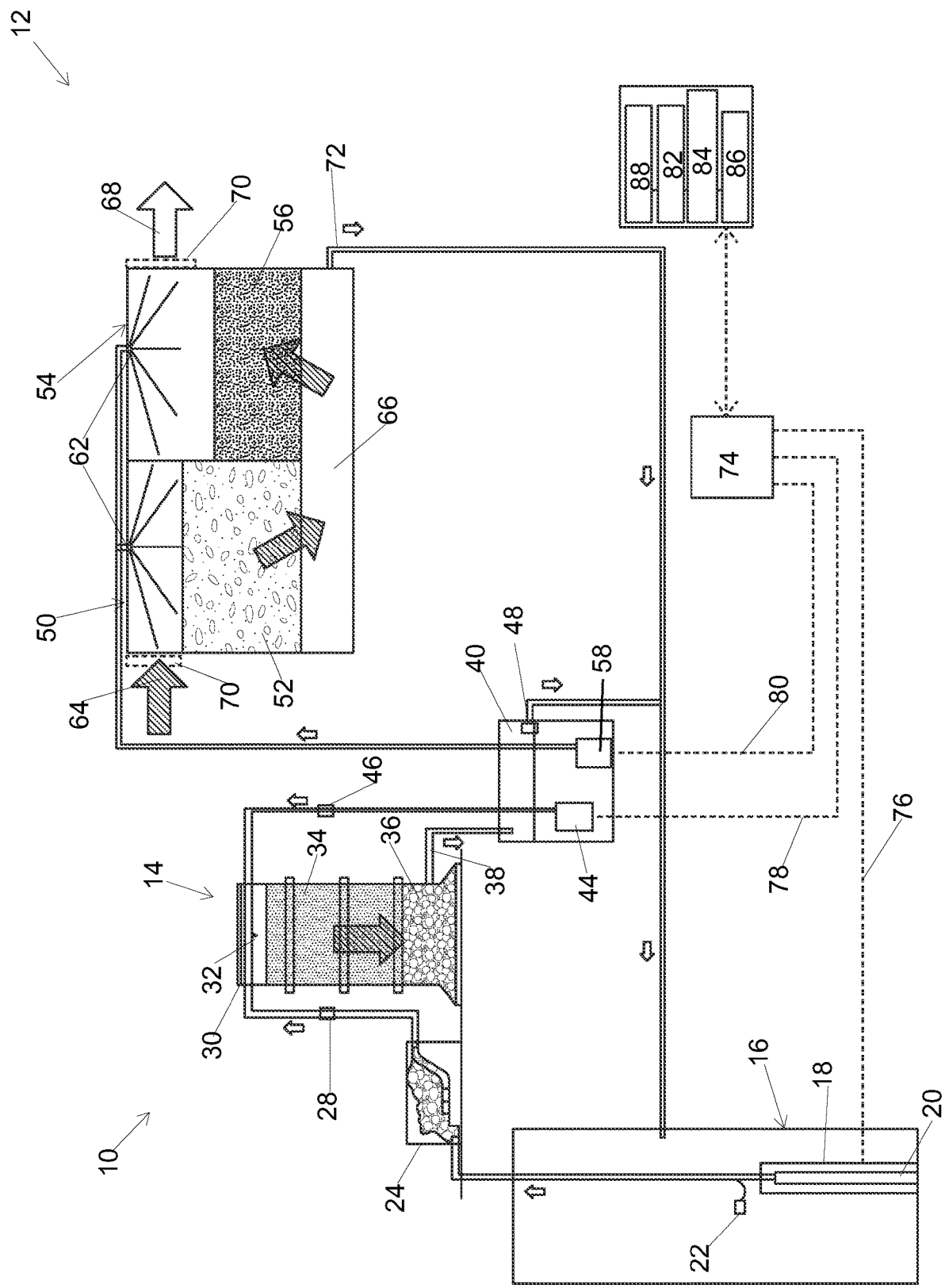

CLOSED-LOOP BIOLOGICAL SYSTEMS AND METHODS UTILIZING AN ONSITE NON-POTABLE WATER TREATMENT FOR ODOR CONTROL IRRIGATION

RELATED APPLICATIONS

The present application claims priority to U.S. Provisional Application No. 63/051,985, filed Jul. 15, 2020, entitled "Closed-Loop Biological Systems and Methods Utilizing an Onsite Non-Potable Water Treatment for Odor Control Irrigation", which is incorporated by reference herein in its entirety.

FIELD

The present disclosure is generally related to the field of biological odor control. In particular, installations in locations where there are either no water utilities, the available utilities are limited to electric power only, or using a water source other than potable water is desired. Embodiments disclosed herein include utilizing onsite non-potable water treatment principles to harvest raw sewer effluent water, and treat it so that it meets specified water quality that can then be used as irrigation water for the biological odor control system before being returned to the sewer line.

BACKGROUND

Municipal wastewater treatment systems can present difficult odor control challenges. Within municipal wastewater collection and treatment systems, there are a variety of sub-systems, such as pump stations, gravity flow with access manholes, wet wells, and lift stations that convey the raw wastewater to the water treatment plant, and which can be a source of odors. Because these structures may be within residential neighborhoods or within business districts, fugitive odors containing hydrogen sulfide and odorous compounds can cause complaints, potential health concerns, and undesirable living or working conditions.

Often the most cost-effective and efficient technology for collection-system odor control applications is a biological treatment process. Biological odor control processes require a continuous supply of irrigation water to support growth and health of the microorganisms in order to operate properly. However, the water supply requirement can present an insurmountable technical problem in sites where a source of suitable irrigation water is not readily available, such as communities in arid environments, such that biological odor control processes do not present a practical solution to wastewater treatment odor control problems. There thus remains a need in the art for alternative solutions addressing these technical limitations of biological odor control processes.

SUMMARY

In one implantation, the present disclosure is directed to a method for treating contaminated air to remove selected compounds using microorganisms in a media bed without use of potable water. The method includes receiving a contaminated water stream; treating the contaminated water stream to form a non-potable irrigation water stream containing contaminants at levels below levels harmful to the microorganisms; irrigating the media bed and microorganisms with the non-potable irrigation water; and producing a treated air stream by directing a contaminated air stream through the irrigated media bed and microorganisms to remove at least one selected compound from the contaminated air stream.

In another implantation, the present disclosure is directed to a method for treating a contaminated air stream to remove selected compounds using microorganisms selected for air treatment in a media bed without use of potable water. The method includes receiving a contaminated water stream; screening the contaminated water stream to remove at least particles with a size greater than about ¼ inch; treating the contaminated water stream to form a non-potable irrigation water stream; passing the contaminated water stream through a water treatment media bed supporting water treatment microorganisms selected to reduce contaminant compounds in the contaminated water stream; recirculating a portion of the non-potable irrigation water stream back through the water treatment media bed; and controlling flow of the contaminated water stream and the recirculated non-potable irrigation water stream through the media bed to control the level of contaminant removal such that contaminant levels in the non-potable irrigation water stream are greater than potable water contaminant levels but below levels harmful to the microorganisms selected for air treatment; directing the contaminated air stream through at least one air treatment media supporting the microorganisms selected to reduce or remove at least one odor causing compound; irrigating the air treatment media and microorganisms therein with the non-potable irrigation water; and exhausting the contaminated air stream from the at least one air treatment media to produce a treated air stream.

In yet another implantation, the present disclosure is directed to a biological odor control system operable in the absence of a potable water supply. The system includes an air treatment reactor vessel containing an odor control media supporting microorganisms selected to remove at least one odor causing compound from contaminated air; a contaminated air inlet and a treated air outlet communicating with the air treatment reactor vessel and defining an airflow path through the odor control media; an irrigation water outlet disposed in the air treatment reactor vessel above the odor control media; a sump configured at the bottom of the air treatment reactor vessel to receive irrigation water and direct irrigation water after flowing through the odor control media to a drain; an irrigation water reactor vessel containing a water treatment media supporting microorganisms selected to reduce contaminant compounds in a contaminated water stream to levels not harmful to the microorganisms supported on the odor control media in the air treatment reactor vessel; a contaminated water inlet and a treated irrigation water outflow communicating with the irrigation water reactor vessel and defining a water flow path through the water treatment media; at least one contaminated water pump communicating with the contaminated water inlet and controlled to provide a flow of contaminated water through the irrigation water reactor vessel at a flow rate modulated to produce a non-potable irrigation water stream at the treated irrigation water outflow containing contaminants at a level less than harmful to the microorganisms contained in the air treatment reactor vessel; an irrigation water tank configured to receive treated irrigation water from the treated irrigation water outflow; and an irrigation water supply configured to deliver irrigation water from the irrigation water tank to the irrigation water outlet in the air treatment reactor vessel.

BRIEF DESCRIPTION OF DRAWINGS

For the purpose of illustrating the disclosure, the drawings show aspects of one or more embodiments of the disclosure.

However, it should be understood that the present disclosure is not limited to the precise arrangements and instrumentalities shown in the drawings, wherein:

FIG. 1 is a schematic diagram depicting an embodiment of a closed-loop biological system for odor control utilizing onsite pre-treatment of wastewater for irrigation of the odor control system.

DETAILED DESCRIPTION

In order to address problems with adequate supply of treatment water for biological odor control systems as explained above, embodiments disclosed herein utilize raw wastewater from a collection/sewer system, treat it to a non-potable level for irrigation water and nutrient seeding for the biological odor control system, then return the process water from the odor control system directly back into the collection/sewer system.

An example of an embodiment of an odor control system 10 according to the present disclosure is illustrated in FIG. 1. As shown therein, system 10 comprises two primary sub-systems: odor control treatment unit 12 and irrigation water treatment unit 14. As described herein, odor control treatment unit 12 and irrigation water treatment unit 14 work together to self-balance and optimize the factors necessary for biological treatment, including time, rate, volume, water, oxygen, carbon, nitrogen, pH, and alkalinity.

Irrigation water treatment unit 14 receives raw sewage or wastewater influent at collection point 16, which may be a wet well, lift station or other suitable containment vessel receiving a wastewater stream. Incoming wastewater is screened through passive or active screen or filter 18. In some embodiments a passive filter is used as filter 18, having a nominal size of about 1/32" to 1/4" is used. In other embodiments a pump screen/filter with a nominal size of about 1/16" to 1/8". Dosing pump 20 delivers the wastewater from collection point 16 to treatment unit 14. In some embodiments, dosing pump 20 capacity will be approximately 3 GPM @ 5 to 20 PSI per cubic meter of the water treatment vessel. The total dynamic head (TDH) for dosing pump 20 should be sufficient to meet individual site requirements with the pump preferably maintaining a 50% duty cycle or less. Float switch 22 detects the wastewater level in collection point 16 to prevent activation of the pump when the wastewater level is too low. With sufficient water level, in some embodiments dosing pump 20 is controlled by a timer based on preset on and off periods calculated to provide the amount of irrigation water needed for the odor control system irrigation. In one example, dosing pump 20 may operate on a cycle of two minutes on, followed by thirty minutes off.

Filter apparatus 24 removes further particulates from the influent wastewater directed to treatment unit 14. In some embodiments, filter apparatus 24 may be configured to automatically self-clean through flushing based on a schedule or based on a pressure differential. The frequency of self-cleaning may be adjusted, as needed, based on system operating parameters. In some embodiments, filter apparatus 24 may comprise a disc filter with a size of approximately 100 microns as typically used for drip irrigation system filtration. In other embodiments the filter size may range from about 100 to about 600 microns. The filtered influent stream passes through check valve 28, before entering reactor vessel 30 of treatment unit 14.

In reactor vessel 30, the influent wastewater stream is sprayed via spray heads 32 over synthetic media 34 and/or natural media 36. The media 34/36 provides surface area, volume, and the ecosystem required for a variety of aerobic microorganisms, such as autotrophic and heterotrophic bacteria, protozoa, and other higher microorganism life forms, to develop and live that will utilize carbon and other compounds in the wastewater stream as a food source. In some embodiments synthetic media 34 is used as a primary media above a natural media 36 as a secondary media. Examples of synthetic media 34 include open cell foam cubes, textile-based materials, polystyrene aggregates, tire chips, foamed glass, plastic such as used in trickling filters, moving bed bioreactors, or submerged aerated filters, or similar. Examples of natural media 36 include coconut coir, peat, wood chips, sand, gravel, seashells, or similar. In such arrangements, the secondary media provides additional treatment and is a structural support mechanism for the primary media above. The secondary media may also be used for pH control. Media 34/36 may be inoculated in reactor vessel 30. Typical inoculants may include commercially available formulations of various microorganisms and/or nutrients. Optionally, atmospheric air may also be added to reactor vessel 30 to enhance treatment via pressure or passive venting.

The treated influent wastewater stream, now suitable as irrigation water for odor control treatment unit 12, drains from outlet 38 at the bottom of reactor vessel 30 into irrigation water tank 40. In one aspect of disclosed embodiments, it is desirable not to treat the incoming wastewater to a potable water level or even to a typical level of effluent water quality standards as required for general dispersal or discharge of treated wastewater. Instead, it may be desirable to maintain a higher level of certain contaminants in the treated irrigation water as certain contaminants are a good source of nutrients for the biological organisms in the odor control treatment unit. In one example, after treatment in irrigation water treatment unit 14, the irrigation water contained in water tank 40 may contain about 5 to 60 ppm TSS, about 10 to 60 ppm total nitrogen with about 2 to 30 ppm in the form of NH3 (ammonia), about 5 to 50 mg/L CBOD5 and about 10 to 100 mg/L COD. Persons of ordinary skill will understand that levels of these contaminants above the stated ranges will be generally harmful to the biological organisms in the odor control treatment unit, whereas contaminant levels within the stated ranges will be beneficial. Lower contaminant levels, as may be found in the products of conventional wastewater treatment processes will not be harmful, but also not specifically beneficial and may require that the irrigation water have nutrient supplements added if over-treated in irrigation water treatment unit 14.

Recirculation pump 44 recirculates a portion of the liquid in irrigation water in irrigation water tank 40 back to reactor vessel 30 via spray heads 32. As may be appreciated by persons of ordinary skill based on the teachings of the present disclosure, recirculation of the irrigation water at this stage can dilute incoming wastewater from collection point 16 and provide enhanced treatment of the wastewater by facilitating balance and optimization of the food-time-Air/O2-water parameters in irrigation water treatment unit 14, potentially allowing for a reduced area or volume requirement (ft2/ft3 in some embodiments) allowing a smaller footprint and reduced nutrient requirements.

Check valve 46 prevents contamination of irrigation water tank 40 by untreated wastewater delivered to spray head 32 by dosing pump 20 when recirculation pump 44 is inactive. Similarly, check valve 28 prevents loss of recirculated irrigation water to collection point 16 when dosing pump 20 is inactive. Recirculation pump 44 is controlled by a programmable timer with associated float switches or other level control methods. Water is recirculated on timed cycles by alternating irrigation under pressure and draining within reactor vessel 30. Media 34/36 may be irrigated so that it is either in an unsubmerged or a submerged state, depending on treatment needed. Timing for operation of recirculation pump 44 may be set by the water treatment level needed in reactor vessel 30. If higher levels of treatment are needed, effluent is dosed through the media more frequently. If more nutrient-rich effluent is needed, dosing frequency is reduced. Overflow drain 48 in irrigation water tank 40 directs excess water back to source containment collection point 16.

Odor control treatment unit 12 may comprise single, or multiple treatment stages utilizing either biological and/or activated carbon treatment processes and shall be used to remove foul odors from the air stream. Systems with multiple treatment stages will have the ability to discharge air to the atmosphere without going through all treatment stages by the use of a by-pass valve or damper, depending on the level of odor removal required. Single, single partitioned, or multiple free-standing treatment vessels or containers shall be used to house the appropriate odor control media(s). In general, treatment vessels in unit 12 can be any shape (round, rectangular, horizontal, vertical). Ductwork shall be used to convey the foul odors from the source to the treatment system. Either natural air pressure, or a fan shall be used to draw the foul odors from the source and direct them through the system for odor removal prior to discharging to the atmosphere. If a fan is used, it can be positioned to either push or pull the air through the treatment system. The irrigation water will be conveyed by either a pump or by gravity flow. The treatment process can utilize downflow (co-current) and/or upflow (counter-current) airflow patterns in any combination throughout the treatment process. The amount of water used will be dependent on each specific application. The irrigation water shall be applied to each biological stage on either a continuous or intermittent basis.

Irrigation water for odor control treatment unit 12 is provided from irrigation water tank 40 by irrigation pump 58 and delivered into first and second reactor vessels 50/54 via spray heads 62. Contaminated air to be treated enters first-stage reactor vessel 50 via inlet duct 64, passes co-currently through synthetic media 52 with the irrigation water, then through sump/air plenum 66, and then up through natural media 56 counter-currently with respect to the flow of irrigation water to exit as treated air out through outlet duct 68. Inlet duct 64 and/or outlet duct 68 optionally may be fitted with fans 70 to assist airflow through treatment unit 12 as needed. Irrigation water is collected in sump/air plenum 66 after passing through the media beds and removed via drain piping 72. Once the irrigation water passes through the media beds, it is drained directly to the wastewater collection system for proper treatment downstream at the wastewater treatment facility. Further examples and details of odor treatment systems and vessels suitable for use with embodiments of the present disclosure are described in Applicant's co-pending, published, US patent application, publication no. 2020/0406189A1, entitled, "Multi-Stage Treatment System and Methods for Removal of Target Vapor Compounds from Contaminated Air Streams," which is incorporated by reference herein in its entirety. Examples of single stage biological odor treatment systems are also disclosed in U.S. Pat. No. 6,019,810, entitled "Effluent Treatment System for Removing Effluent Gases from a Gas Stream," which is also incorporated by reference herein in its entirety.

In the example embodiment shown in FIG. 1, odor control treatment unit 12 is a two-stage process with first-stage reactor vessel 50 containing synthetic media 52, and second-stage reactor vessel 54 containing natural media 56. Examples of synthetic media 52 include reticulated foam, poly foam, foamed glass and structural plastic and examples of natural media 56 include lava rock, expanded shale, woodchips and sea shells. Synthetic media is well-suited to support autotrophic bacteria, which are particularly effective in first-stage reactor vessel 50 because of extremely low pH. Natural media is well-suited to support heterotrophic bacteria which are particularly effective in second-stage reactor vessel 54 because they are generally pH neutral and can contain additional needed nutrients for beneficial bacteria. As explained above, the irrigation water will contain various nutrients that will enhance the odor control treatment process. In non-limiting examples, hydrogen sulfide may be effectively removed using a bed containing autotrophic microorganisms such as *Thiobacillus* species, and when second-stage air treatment is employed additional hydrogen sulfide, as well as other contaminants, such as ammonia, dimethyl sulfide, and methyl mercaptan, can be removed in a second stage bed containing heterotrophic microorganisms, such as *Rhodococcus, Pseudomonas*, fungi *Nitrosomonas* and/or *Nitrobacter* species. Additional information regarding suitable biological organisms are disclosed in the foregoing incorporated by reference patent publications.

Process controls provide an adjustable volume of process water based on system requirements as set in controller 74. Controller 74 controls on and off times for one or more of dosing pump 20, recirculation pump 44 and irrigation pump 58 via communications links 76, 78 and 80, respectively. Controller 74 may take a number of different forms, such as an integrated control panel, and may contain or communicate with process control modules including a processor 82, memory/storage 84 (containing instructions for process control as described herein) and appropriate I/O devices or user interfaces 86. Advantages of disclosed embodiments include the ability of controller 74 to control the system with relatively non-complex control logic. For example, in some embodiments, inputs to process control may require only one or more float switches that determine liquid level interacting with timers set in the control logic. The timers may comprise repeat cycle timers that are set with user-defined on times and off times for various pumps. Alternatively, controller 74 also may contain or communicate with additional flow control devices via additional communication links, such as automated control valves and pumps, and sensors such as pressure, flow, and chemical sensors, in order to provide inputs to the control algorithms executed by the processor. Communication links may comprise conventional wired or wireless communication channels as may be devised by persons of ordinary skill in the art for communication in process system controls.

Controller 74 also may control air volume treated, such as by processor control of air flow control devices, such as inlet and outlet fans 70 and/or air valves in the duct work delivering foul air to the odor treatment vessel(s). Air flow control algorithms 88 also may be executed in the processor of this purpose and communicate control signals based therein to the air control devices such as the optional inlet or outlet fans. In this manner the volume of foul air treated will be adjustable based on system requirements. The entire system 10 may utilize off-the-grid energy sources such as solar-powered or wind-powered batteries to operate in areas with no utilities.

Among unique features of the present disclosure is the ability and technique for extracting water from the wet well through physical particle screening of gross and fine solid materials. Embodiments disclosed thus may provide a continuous source of nutrients from non-potable water treatment system as required by a biological air treatment system without the addition of supplemental nutrient feeds. Treated non-potable water strength and nutrient bioavailability may be dynamically adjusted to suit the optimal microorganism growth within the biological air treatment system establishing a co-dependent, symbiotic relationship. Disclosed embodiments are thus well-suited for installation at sites with no available potable water supply, water scarcity challenges, or requirements to reduce energy and water footprint.

Further features and advantages of disclosed embodiments include, in random order, lettered only for convenient reference:

a. Continuous source of nutrients from the onsite non-potable water treatment system without the addition of supplemental nutrient feeds.
b. Treated non-potable water volume and nutrient bioavailability may be adjusted to suit the optimal microorganism growth within the biological air treatment system establishing a co-dependent, symbiotic relationship.
c. Sites with no available potable water supply, water scarcity challenges, or requirements to reduce energy and water footprint.
d. Novel way to extract water from the wet well through physical particle screening of gross and fine solid materials.
e. Volume of treated water is adjustable based on system requirements.
f. In the reactor vessel, effluent is sprayed over a synthetic and/or a natural media, the media may be inoculated in the treated effluent water tank. The media provides surface area, volume, and the ecosystem required for a variety of aerobic microorganisms to develop and live that will utilize carbon and other nutrients as a food source. The secondary media provides treatment and is a structural support mechanism. It may also be used for pH control.
g. The media irrigated may be adjusted so that it is either in an unsubmerged or a submerged state, depending on treatment needed.
h. Atmospheric air may also be added to reactor vessel to enhance treatment via pressure or passive venting.
i. Onsite non-potable water treatment system is suited to handle the variability in flow and waste constituents concentration from the source containment collection point, for example a sewer wet well.
j. The biological odor control process requires a continuous supply of either potable or non-potable irrigation water to be applied over the biological media bed(s).
k. The biological odor control system shall include either a single stage or multiple stages of specialty media designed to colonize naturally occurring microorganisms used to treat foul odors.
l. The biological odor control process shall draw foul air from the source by means of a fan and ductwork.
m. The transfer of irrigation water between the onsite non-potable water treatment system and the odor control system shall be by either pump or gravity.
n. The volume of foul air treated will be adjustable based on system requirements.
o. The onsite non-potable water treatment system irrigation water may be dosed over the reactor vessel media either one time or multiple times, depending on the water quality needed for odor treatment.
p. All drain water from the odor control system shall be discharged into the sewer system for treatment downstream by the central treatment plant.
q. Once the air is treated, it is discharged to the atmosphere.
r. The onsite non-potable water treatment system and the odor control treatment system, independently of each other and in symbiosis with each other, self-balance and optimize the factors necessary for biological treatment, which are time, rate, volume, water, oxygen, carbon, nitrogen, pH, and alkalinity.
s. Reduction in potable water demand thereby conserving it for potable uses such as drinking water.
t. Reduction in water and energy demand which reduces carbon emissions and footprint.
u. Reduction of community impacts on climate change and improvements to air quality, water quality, and community health through combining the two independent treatment processes as one symbiotic system
v. The footprint and weight of the system allows it to be utilized in tight spaces, remote locations, and as a permanent or mobile installation.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure or of the inventions as set forth in following claims.

What is claimed is:

1. A method for treating contaminated air to remove selected compounds using microorganisms in a media bed without use of potable water, comprising:

receiving a contaminated water stream;

treating the contaminated water stream to form a non-potable irrigation water stream containing contaminants at levels below levels harmful to the microorganisms, wherein the non-potable irrigation water stream has contaminant levels of about 5 to 60 ppm TSS, about 10 to 60 ppm total nitrogen with about 2 to 30 ppm in the form of NH3 (ammonia), about 5 to 50 mg/L CBOD5 and about 10 to 100 mg/L COD;

irrigating the media bed and microorganisms with the non-potable irrigation water stream; and producing a treated air stream by directing a contaminated air stream through the irrigated media bed and microorganisms to remove at least one selected compound from the contaminated air stream;

wherein said treating the contaminated water stream comprises:

passing the contaminated water stream through a water treatment media bed supporting water treatment microorganisms selected to reduce contaminant compounds in the contaminated water stream;

recirculating a portion of the non-potable irrigation water stream back through the water treatment media bed; and controlling flow of the contaminated water stream and the recirculated portion of non-potable irrigation water stream through the media bed to control the level of contaminant removal;

and wherein said controlling comprises controlling said flows to maintain said contaminant levels in the non-potable irrigation water stream to be at a level beneficial to the microorganisms used in producing the treated air stream.

2. The method of claim 1, further comprising controlling said treating the contaminated water stream to provide said contaminants in the non-potable irrigation water stream at levels beneficial to the microorganisms.

3. The method of claim 1, wherein the water treatment microorganisms comprise at least one of an autotrophic and heterotrophic bacteria and protozoa.

4. The method of claim 1, wherein said treating the contaminated water stream further comprises screening the contaminated water stream to remove particles with a size greater than about 1/32 inch.

5. The method of claim 4, wherein said producing a treated air stream comprises directing the contaminated air stream through at least one air treatment media supporting microorganisms selected to reduce or remove at least one odor causing compound.

6. The method of claim 4, wherein screening the contaminated water stream comprises a first screening to remove particles with sizes in a range of about 1/32 inch to about 1/4 inch and a second screening to remove particles with a size greater than about 100 microns.

7. The method of claim 1, wherein said producing a treated air stream comprises directing the contaminated air stream through at least one air treatment media supporting microorganisms selected to reduce or remove at least one odor causing compound.

8. The method of claim 7, wherein said producing a treated air stream further comprises directing the contaminated air stream through at least a second air treatment media comprising a different media type, the second air treatment media supporting biological processes with microorganism populations which are differentiated from the microorganisms in first air treatment media.

9. The method of claim 1, wherein said receiving a contaminated water stream comprises receiving an untreated municipal wastewater stream containing municipal sewage sludge (MSS).

10. A method for treating a contaminated air stream to remove selected compounds using microorganisms selected for air treatment in a media bed without use of potable water, comprising:

receiving a contaminated water stream;

screening the contaminated water stream to remove at least particles with a size greater than about 1/4 inch;

treating the contaminated water stream to form a non-potable irrigation water stream;

passing the contaminated water stream through a water treatment media bed supporting water treatment microorganisms selected to reduce contaminant compounds in the contaminated water stream;

recirculating a portion of the non-potable irrigation water stream back through the water treatment media bed; and controlling flow of the contaminated water stream and the recirculated portion of non- potable irrigation water stream through the media bed to control the level of contaminant removal such that contaminant levels in the non-potable irrigation water stream are greater than potable water contaminant levels but below levels harmful to the microorganisms selected for air treatment, wherein the non-potable irrigation water stream has contaminant levels of about 5 to 60 ppm TSS, about 10 to 60 ppm total nitrogen with about 2 to 30 ppm in the form of NH3 (ammonia), about 5 to 50 mg/L CBOD5 and about 10 to 100 mg,L COD;

directing the contaminated air stream through at least one air treatment media supporting the microorganisms selected to reduce or remove at least one odor causing compound;

irrigating the air treatment media and microorganisms therein with the non-potable irrigation water stream; and exhausting the contaminated air stream from the at least one air treatment media to produce a treated air stream.

11. The method of claim 10, wherein said controlling further comprises controlling said flows to maintain said contaminant levels in the non-potable irrigation water stream to be at a level beneficial to the microorganisms selected for air treatment.

12. The method of claim 11, wherein the contaminated water stream comprises untreated municipal sewage sludge (MSS).

13. The method of claim 1, wherein the microorganisms in the irrigated media bed comprise at least one of autotrophic bacteria and heterotrophic bacteria.

14. The method of claim 10, wherein the compounds removed from contaminated air comprise hydrogen sulfide and the microorganisms supported in the at least one air treatment media comprise at least one of autotrophic bacteria and heterotrophic bacteria.

15. The method of claim 14, wherein compounds removed from contaminated air further comprise at least one of ammonia, dimethyl sulfide, and methyl mercaptan, and the microorganisms supported in the at least one air treatment media comprise a first stage air treatment media supporting *Thiobacillus* species and a second stage air treatment media supporting one or more of *Rhodococcus, Pseudomonas*, fungi, *Nitrosomonas* and *Nitrobacter* species.

* * * * *